United States Patent
Ramappan et al.

(10) Patent No.: US 9,932,917 B2
(45) Date of Patent: Apr. 3, 2018

(54) EXHAUST GAS RECIRCULATION CONTROL SYSTEMS AND METHODS

(75) Inventors: Vijay Ramappan, Novi, MI (US); Darrell W. Burleigh, South Lyon, MI (US); Martino Casetti, Waterford, MI (US)

(73) Assignee: GM Global Technology Operations LLC, Detroit (*) Notice: Subject to any disclaimer, the term of this patent is extended or adjusted under 35 U.S.C. 154(b) by 1756 days.

(21) Appl. No.: 13/425,723

(22) Filed: Mar. 21, 2012

(65) Prior Publication Data

US 2013/0253798 A1    Sep. 26, 2013

(51) Int. Cl.
*F02D 41/00* (2006.01)
*F02P 5/15* (2006.01)
(Continued)

(52) U.S. Cl.
CPC ..... *F02D 41/0002* (2013.01); *F02D 41/0072* (2013.01); *F02D 2021/083* (2013.01); *F02D 2041/286* (2013.01); *F02D 2200/1004* (2013.01); *F02P 5/15* (2013.01); *Y02T 10/42* (2013.01); *Y02T 10/47* (2013.01)

(58) Field of Classification Search
CPC .............. F02D 2021/083; F02D 21/08; F02D 2041/0017; F02D 2041/002; F02D 2041/0022; F02D 41/0072; F02D 41/0025–41/0055; Y02T 10/121
USPC ................. 123/568.11, 568.21–568.28, 698; 701/102–104, 108; 60/299, 288, 605.2, 60/39.52
See application file for complete search history.

(56) References Cited

U.S. PATENT DOCUMENTS

| | | | |
|---|---|---|---|
| 4,790,286 | A | 12/1988 | Nishida et al. |
| 4,836,174 | A | 6/1989 | Chujo et al. |

(Continued)

FOREIGN PATENT DOCUMENTS

| | | |
|---|---|---|
| CN | 101988432 A | 3/2011 |
| CN | 202510230 U | 10/2012 |

(Continued)

OTHER PUBLICATIONS

U.S. Appl. No. 13/490,821, filed Jun. 7, 2012, Wiggins et al.
(Continued)

*Primary Examiner* — David Hamaoui
*Assistant Examiner* — Carl Staubach (57) ABSTRACT

An engine control system for a vehicle includes a flowrate module, first and second mass fraction calculating modules, and an actuator control module. The flowrate module determines a mass flowrate of exhaust gas recirculation (EGR) to an engine. The first mass fraction calculating module, based on the mass flowrate of EGR, determines a first mass fraction of recirculated exhaust gas relative of a first gas charge for a first combustion event of the engine. The second mass fraction calculating module determines a second mass fraction of recirculated exhaust gas of a second gas charge for a second combustion event of the engine based on an average of the first mass fraction and one or more other values of the first mass fraction determined for other combustion events, respectively. The actuator control module selectively adjusts an engine operating parameter based on the second mass fraction.

20 Claims, 5 Drawing Sheets

(51) Int. Cl.
  *F02D 21/08* (2006.01)
  *F02D 41/28* (2006.01)

(56) References Cited

U.S. PATENT DOCUMENTS

| | | | |
|---|---|---|---|
| 4,905,654 A | 3/1990 | Katsuno et al. | |
| 4,942,860 A | 7/1990 | Chujo et al. | |
| 4,990,235 A | 2/1991 | Chujo | |
| 5,034,112 A | 7/1991 | Murase et al. | |
| 5,190,017 A | 3/1993 | Cullen et al. | |
| 5,205,260 A | 4/1993 | Takahashi et al. | |
| 5,207,093 A | 5/1993 | Maeda | |
| 5,465,617 A | 11/1995 | Dudek et al. | |
| 5,639,961 A | 6/1997 | Lautenschutz | |
| 6,000,385 A | 12/1999 | Fukuma | |
| 6,029,451 A | 2/2000 | Gartner | |
| 6,164,270 A | 12/2000 | Bidner et al. | |
| 6,309,534 B1 | 10/2001 | Fray et al. | |
| 6,311,679 B1* | 11/2001 | Druzhinina et al. | 123/568.21 |
| 6,575,148 B1 | 6/2003 | Bhargava et al. | |
| 6,711,892 B2 | 3/2004 | Tamura et al. | |
| 6,739,177 B2 | 5/2004 | Sato et al. | |
| 6,802,302 B1* | 10/2004 | Li et al. | 123/568.16 |
| 6,817,197 B1 | 11/2004 | Padfield | |
| 7,104,259 B2 | 9/2006 | Terada | |
| 7,155,332 B2 | 12/2006 | Yamada et al. | |
| 7,261,098 B2 | 8/2007 | Vigild et al. | |
| 7,267,117 B2 | 9/2007 | Tonetti et al. | |
| 7,318,409 B2 | 1/2008 | Cullen | |
| 7,400,967 B2 | 7/2008 | Ueno et al. | |
| 7,526,950 B2 | 5/2009 | Van Nieuwstadt et al. | |
| 7,565,901 B2 | 7/2009 | Furuta et al. | |
| 7,620,490 B2 | 11/2009 | Matsunaga | |
| 7,715,976 B1 | 5/2010 | Xiao et al. | |
| 8,042,528 B2 | 10/2011 | Gates et al. | |
| 8,521,354 B2 | 8/2013 | Sasaki | |
| 8,733,081 B2 | 5/2014 | Miyashita | |
| 2001/0032637 A1 | 10/2001 | Grieve et al. | |
| 2002/0066442 A1* | 6/2002 | Muller et al. | 123/568.11 |
| 2002/0139360 A1 | 10/2002 | Sato et al. | |
| 2003/0106367 A1 | 6/2003 | Osaki et al. | |
| 2003/0115854 A1 | 6/2003 | Tamura et al. | |
| 2003/0159521 A1 | 8/2003 | Sarholz et al. | |
| 2004/0061290 A1 | 4/2004 | Gray | |
| 2004/0079332 A1 | 4/2004 | Kotwicki | |
| 2005/0131620 A1* | 6/2005 | Bowyer | 701/108 |
| 2005/0139193 A1 | 6/2005 | Kobayashi et al. | |
| 2005/0161029 A1 | 7/2005 | Ishikawa | |
| 2005/0274369 A1 | 12/2005 | Tonetti et al. | |
| 2006/0048760 A1 | 3/2006 | Matsunaga et al. | |
| 2006/0064228 A1 | 3/2006 | Huang | |
| 2006/0213490 A1 | 9/2006 | Vigild et al. | |
| 2007/0062499 A1 | 3/2007 | Miyasako et al. | |
| 2007/0174003 A1 | 7/2007 | Ueno et al. | |
| 2008/0178853 A1 | 7/2008 | Yamaoka et al. | |
| 2009/0038308 A1 | 2/2009 | Nagae | |
| 2009/0132153 A1 | 5/2009 | Shutty et al. | |
| 2010/0042284 A1 | 2/2010 | Sasaki | |
| 2010/0224174 A1 | 9/2010 | Tabata | |
| 2011/0011378 A1 | 1/2011 | Nakamura | |
| 2011/0023847 A1 | 2/2011 | Gates et al. | |
| 2011/0054762 A1 | 3/2011 | Nakayama et al. | |
| 2011/0072793 A1 | 3/2011 | Bidner et al. | |
| 2011/0077838 A1 | 3/2011 | Osburn et al. | |
| 2011/0191010 A1 | 8/2011 | Russ et al. | |
| 2012/0046854 A1 | 2/2012 | Sangkyu et al. | |
| 2012/0116648 A1 | 5/2012 | Russ et al. | |
| 2012/0227714 A1 | 9/2012 | Surnilla et al. | |
| 2012/0227719 A1 | 9/2012 | Surnilla et al. | |
| 2012/0303346 A1* | 11/2012 | Takezoe et al. | 703/9 |
| 2013/0054122 A1 | 2/2013 | Aoyagi | |
| 2013/0073179 A1 | 3/2013 | Song et al. | |
| 2013/0226435 A1 | 8/2013 | Wasberg et al. | |
| 2013/0238218 A1 | 9/2013 | Wiggins et al. | |
| 2013/0268176 A1 | 10/2013 | Song et al. | |
| 2013/0332050 A1 | 12/2013 | Song et al. | |
| 2014/0149015 A1 | 5/2014 | Pursifull | |

FOREIGN PATENT DOCUMENTS

| | | |
|---|---|---|
| JP | 63140856 A | 6/1988 |
| JP | 63159664 A | 7/1988 |
| JP | 405118246 | 5/1993 |
| JP | 2003148258 A | 5/2003 |
| JP | 2006029084 A | 2/2006 |
| JP | 2008248888 A | 10/2008 |
| JP | 2009243283 A | 10/2009 |
| JP | 2009287491 A | 12/2009 |
| JP | 2010203281 A | 9/2010 |
| WO | WO-2009118605 A1 | 10/2009 |

OTHER PUBLICATIONS

U.S. Appl. No. 13/490,885, filed Jun. 7, 2012, Song et al.
U.S. Appl. No. 13/408,577, filed Feb. 29, 2012, Jon C. Wasberg et al.
U.S. Appl. No. 13/238,460, filed Sep. 21, 2011, B. Jerry Song et al.
U.S. Appl. No. 13/440,570, filed Apr. 5, 2012, Song et al.
Office Action dated Feb. 19, 2017, from the German Patent Office for German Patent Application No. 10 2013 204 699.5; 4 pages.

* cited by examiner

EXHAUST GAS RECIRCULATION CONTROL SYSTEMS AND METHODS

FIELD

The present disclosure relates to internal combustion engines and, more specifically, to exhaust gas recirculation control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts air and fuel to generate torque. Air flows into the engine through an intake system. The intake system may include a throttle valve and an intake manifold. Fuel is provided by one or more fuel injectors. The engine outputs torque to a transmission. The transmission transfers torque to one or more wheels. Exhaust resulting from combustion is expelled from the engine to an exhaust system.

An exhaust gas recirculation (EGR) system re-circulates exhaust back to the intake system. For exhaust to flow back to the intake system, pressure within the exhaust system must be greater than a pressure where the exhaust flows to the intake system. The EGR system maybe controlled such that a target mixture of exhaust, air, and fuel is provided to each cylinder. The engine may not operate as intended when the target mix is not maintained.

SUMMARY

An engine control system for a vehicle includes a flowrate module, first and second mass fraction calculating modules, and an actuator control module. The flowrate module determines a mass flowrate of exhaust gas recirculation (EGR) to an engine. The first mass fraction calculating module, based on the mass flowrate of EGR, determines a first mass fraction of recirculated exhaust gas relative of a first gas charge for a first combustion event of the engine. The second mass fraction calculating module determines a second mass fraction of recirculated exhaust gas of a second gas charge for a second combustion event of the engine based on an average of the first mass fraction and one or more other values of the first mass fraction determined for other combustion events, respectively. The actuator control module selectively adjusts an engine operating parameter based on the second mass fraction.

An engine control method for a vehicle includes: determining a mass flowrate of exhaust gas recirculation (EGR) to an engine; based on the mass flowrate of EGR, determining a first mass fraction of recirculated exhaust gas relative of a first gas charge for a first combustion event of the engine; determining a second mass fraction of recirculated exhaust gas of a second gas charge for a second combustion event of the engine based on an average of the first mass fraction and one or more other values of the first mass fraction determined for other combustion events, respectively; and selectively adjusting an engine operating parameter based on the second mass fraction.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts air and fuel within cylinders to produce drive torque for a vehicle. The engine outputs exhaust resulting from combustion to an exhaust system. An exhaust gas recirculation (EGR) system re-circulates exhaust from the exhaust system back to an intake system.

A gas charge is drawn into a cylinder of the engine for each combustion event of the engine. The gas charge may include air drawn through a throttle valve, exhaust recirculated via the EGR system, and one or more other gasses, such as fuel vapor from a vapor purge system.

The mass of the gas charge of a combustion event is approximately equal to the sum of the mass of the air, the mass of the exhaust, and the mass of the one or more other gasses. Stated another way, the sum of a mass fraction of the air of the gas charge, a mass fraction of the exhaust of the gas charge, and a mass fraction of the one or more other gasses of the gas charge is approximately equal to one.

An engine control module (ECM) may selectively adjust one or more engine operating parameters based on the mass fraction of exhaust of a gas charge. For example only, the ECM may selectively adjust one or more engine operating parameters to achieve a target mass fraction of exhaust for a given combustion event. The ECM may selectively adjust, for example, opening of an EGR valve, opening of a throttle valve, boost provided by one or more boost devices, and/or one or more other engine airflow parameters to achieve a target mass fraction of exhaust for a given combustion event. In another example, the ECM may selectively adjust spark timing, fuel injection timing, and/or fuel injection amount based on the mass fraction of exhaust of a gas charge.

The ECM estimates a mass flowrate of exhaust flowing back to the engine for steady-state EGR flow conditions. Based on the estimated mass flowrate of exhaust and a mass air flowrate (MAF) into the engine, the ECM estimates a mass fraction of exhaust for combustion events that occur under steady-state EGR flow conditions. The mass fraction of exhaust for a combustion event that occurs under steady-state EGR flow conditions may be referred to as a steady-state (SS) EGR mass fraction.

EGR flow, however, is not always steady-state. The ECM may control EGR flow as a function of current engine operating conditions. A change in one or more of engine operating conditions may cause a change in EGR flow to occur. For example, a change in EGR flow may occur in response to a change in opening of the throttle valve, a change in opening of the EGR valve, and/or a change in manifold pressure.

The ECM of the present disclosure estimates the mass fraction of exhaust for a given combustion event based on the SS EGR mass fraction estimated for the given combustion event and one or more of the SS EGR mass fractions estimated for one or more previous combustion events, respectively. More specifically, the ECM estimates the mass fraction of exhaust for a given combustion event based on an average, such as a weighted average, of the SS EGR mass fraction estimated for the combustion event and one or more of the SS EGR mass fractions estimated for one or more previous combustion events, respectively.

Figure 1A:
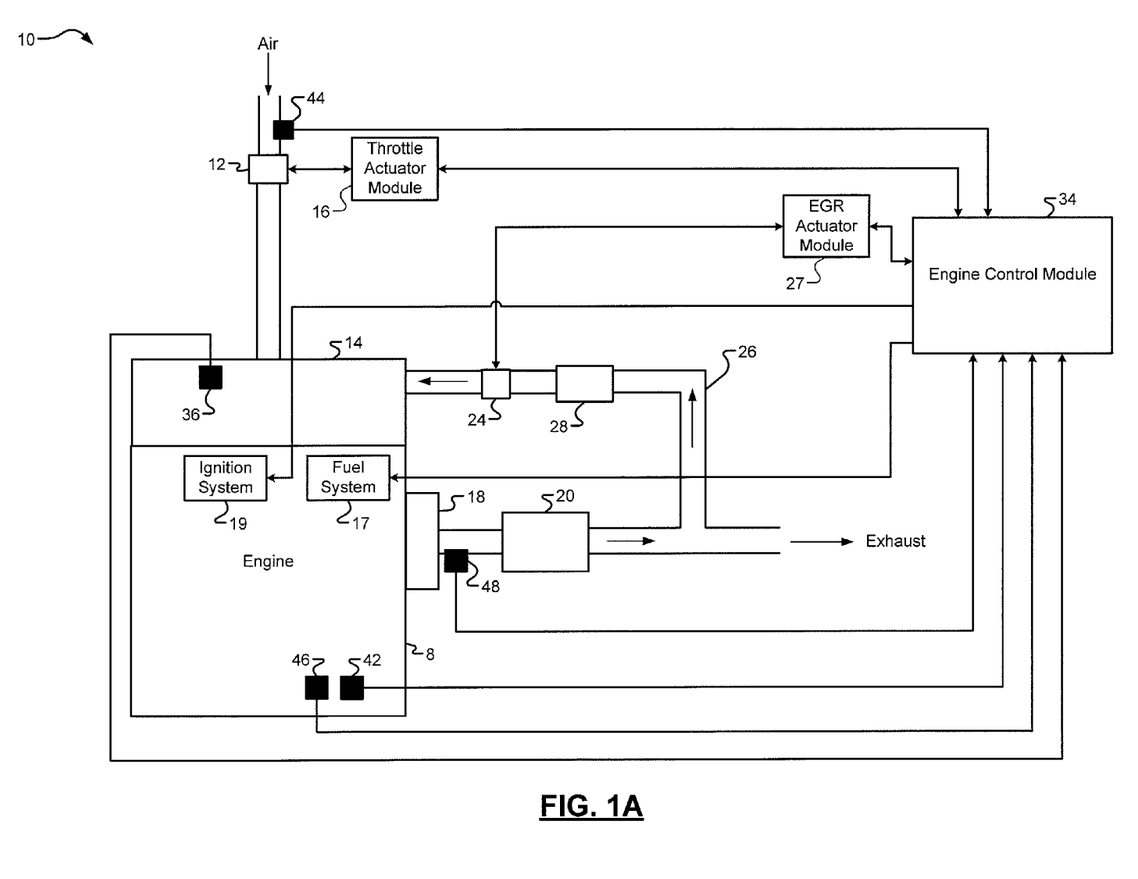
FIGS. 1A and 1B are functional block diagrams of example engine systems according to the present disclosure.
Figure 1B:
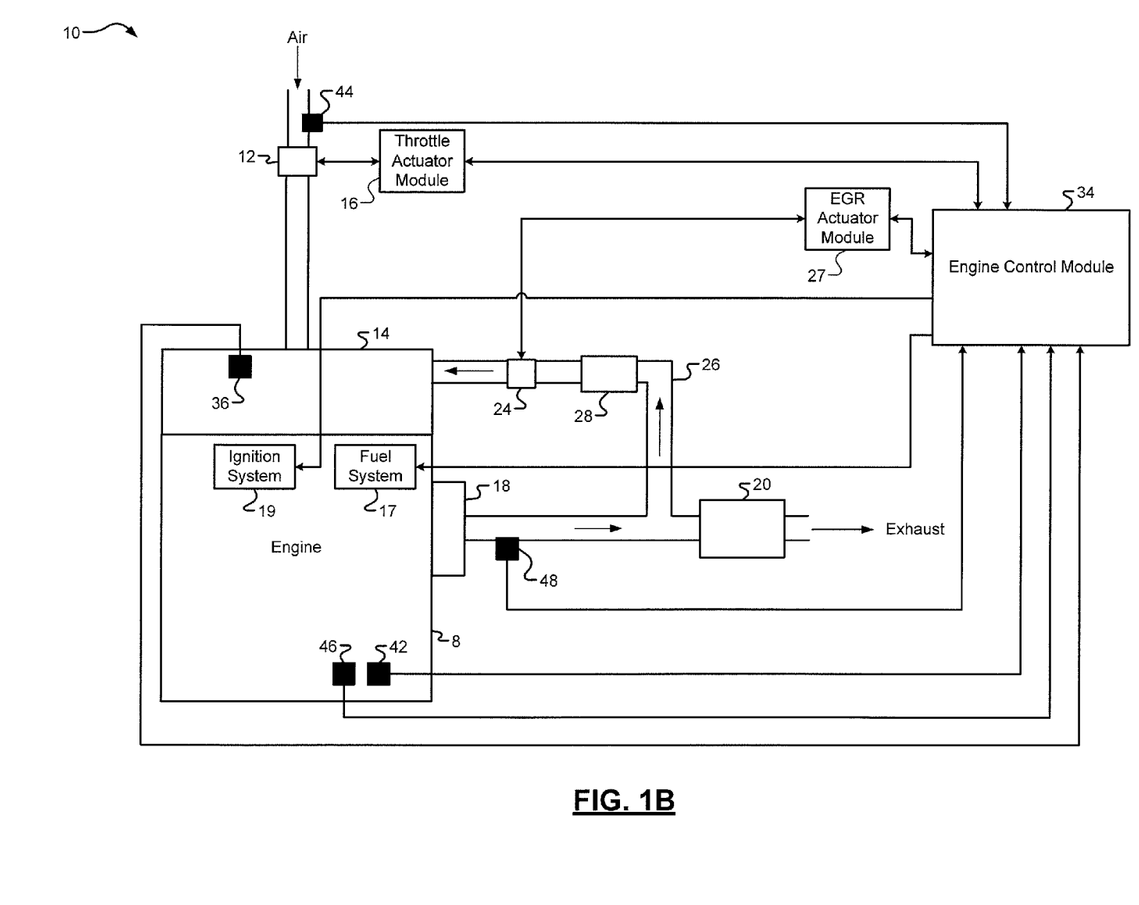

Referring now to FIGS. 1A and 1B, functional block diagrams of examples of an engine system 10 are presented. While the engine system 10 will be discussed in terms of a spark ignition engine system, the present application is also applicable to other types of engine systems including compression ignition engine systems and hybrid engine systems.

Air is drawn into an engine 8 through an intake system. The intake system may include a throttle valve 12 and an intake manifold 14. Air may flow into the engine 8 through the throttle valve 12 and the intake manifold 14. The throttle valve 12 regulates airflow into the intake manifold 14. A throttle actuator module 16 controls actuation of the throttle valve 12. The engine 8 combusts an air/fuel mixture within cylinders of the engine 8. A fuel system 17 selectively injects fuel into the engine 8. An ignition system 19 selectively provides spark to the engine 8 for combustion.

Combustion of the air/fuel mixture drives a crankshaft and produces exhaust. The engine 8 outputs the exhaust to an exhaust manifold 18. A catalyst 20 receives the exhaust from the exhaust manifold 18 and reacts with various components of the exhaust. For example only, the catalyst 20 may include a three-way catalyst (TWC), a catalytic converter, or another suitable type of catalyst.

An EGR system selectively recirculates a portion of the exhaust back to the intake system. While recirculation of exhaust back to the intake manifold 14 is shown and will be discussed, exhaust can be recirculated back to other places in the intake system. The EGR system includes an EGR valve 24 and an EGR conduit 26. Operation of the engine 8 creates a vacuum (low pressure relative to ambient pressure) within the intake manifold 14. Opening the EGR valve 24 allows exhaust to be recirculated back to the intake manifold 14. An EGR actuator module 27 may control actuation of the EGR valve 24.

The EGR system may also include an EGR cooler 28 that cools exhaust as the exhaust flows through the EGR cooler 28 on its way back to the intake manifold 14. In various implementations, the EGR system may further include a cooler bypass system that can be controlled to allow exhaust to bypass the EGR cooler 28 on its way back to the intake manifold 14. The exhaust may be recirculated back to the intake manifold 14 from downstream of the catalyst 20 as shown in FIG. 1A. As shown in FIG. 1B, the exhaust may alternatively be recirculated back to the intake manifold 14 from upstream of the catalyst 20.

An engine control module (ECM) 34 regulates operation of the engine system 10. For example, the ECM 34 may control opening of the throttle valve 12 via the throttle actuator module 16, opening of the EGR valve 24 via the EGR actuator module 27, fuel injection amount and timing via the fuel system 17, and spark timing via the ignition system 19. The ECM 34 may also control the operation of the intake and exhaust valve actuators, boost devices, and/or one or more other suitable engine actuators.

The ECM 34 communicates with various sensors, such as a manifold absolute pressure (MAP) sensor 36, an engine speed sensor 42, a mass air flow (MAF) sensor 44, an engine coolant temperature sensor 46, an exhaust temperature sensor 48, and/or one or more other suitable sensors. The MAP sensor 36 generates a MAP signal indicating an absolute pressure in the intake manifold 14. The engine speed sensor 42 generates a signal based on rotation of the crankshaft. An engine speed, in revolutions per minute (RPM), can be generated based on the rotation of the crankshaft.

The engine coolant temperature sensor 46 generates a coolant temperature signal indicating an engine coolant temperature. The exhaust temperature sensor 48 generates an exhaust temperature signal indicating the exhaust temperature prior to the exhaust flowing through the EGR cooler 28 and/or other treatment devices. The MAF sensor 44 generates a MAF signal indicating mass flowrate of air into the intake manifold 14. The ECM 34 determines an engine load. For example only, the ECM 34 may determine the engine load based on an engine output torque and/or a fueling rate of the engine 8. The fueling rate may be, for example, an amount (e.g., volume or mass) of fuel per combustion event.

Figure 2:
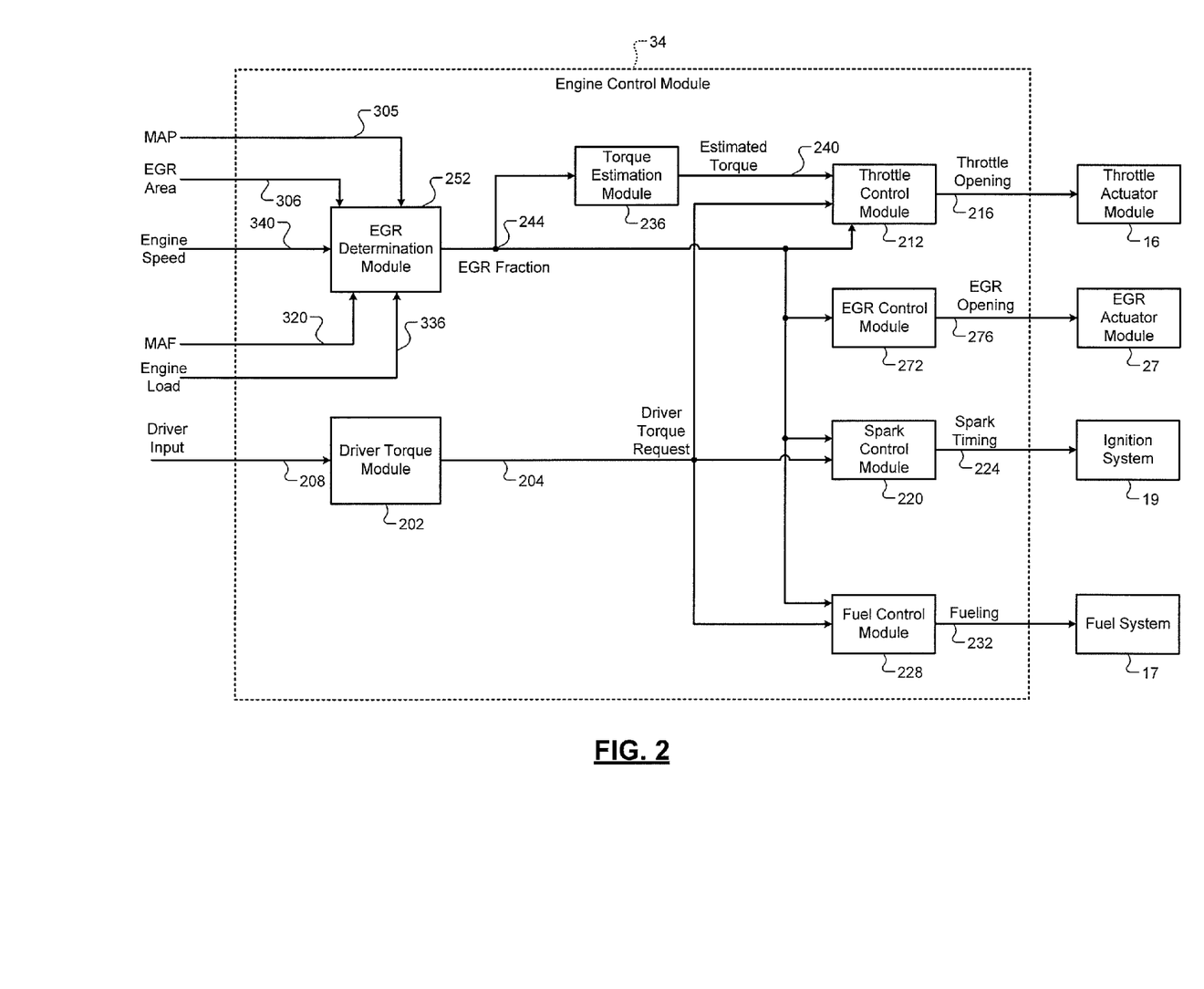
FIG. 2 is a functional block diagram of an example engine control system according to the present disclosure.

Referring now to FIG. 2, a functional block diagram of an example implementation of the ECM 34 is presented. A driver torque module 202 may determine a driver torque request 204 based on one or more driver inputs 208, such as an accelerator pedal position, a brake pedal position, a cruise control input, and/or one or more other suitable driver inputs. One or more engine actuators may be controlled based on the driver torque request 204 and/or one or more other torque requests.

For example, a throttle control module 212 may determine a desired throttle opening 216 based on the driver torque request 204. The throttle actuator module 16 may adjust opening of the throttle valve 12 based on the desired throttle opening 216. A spark control module 220 may determine a desired spark timing 224 based on the driver torque request 204. The ignition system 19 may generate spark based on the desired spark timing 224. A fuel control module 228 may determine one or more desired fueling parameters 232 based on the driver torque request 204. For example, the desired fueling parameters 232 may include fuel injection timing and amount. The fuel system 17 may inject fuel based on the desired fueling parameters 232.

A torque estimation module 236 may estimate a torque output of the engine 8. The estimated torque output of the engine 8 will be referred to as an estimated torque 240. The throttle control module 212 may adjust the desired throttle opening 216 based on the estimated torque 240. For example, the throttle control module 212 may use the estimated torque 240 to perform closed-loop control of one or more engine air flow parameters, such as throttle area, MAP, and/or one or more other suitable air flow parameters.

The torque estimation module 236 may determine the estimated torque 240 using a torque relationship. For example, the torque estimation module 236 may determine the estimated torque 240 using the relationship:

$$T = f(APC, S, I, E, AF, OT, \#, EGR),$$

where torque (T) is the estimated torque 240 and is a function of air per cylinder (APC), spark advance/timing (S), intake opening timing and duration (I), exhaust opening timing and duration (E), air/fuel ratio (AF), oil temperature (OT), number of activated cylinders (#), and EGR mass fraction (EGR) 244. This relationship may be embodied as an equation and/or as a mapping (e.g., lookup table).

The APC may be determined, for example, based on measured MAF and current engine speed. An EGR determination module 252 (see also FIG. 3) determines the EGR fraction 244 as discussed further below. The EGR fraction 244 corresponds to a (expected) mass fraction of EGR to the mass of a gas charge of a next combustion event of the engine 8.

The spark control module 220 may determine the desired spark timing 224 using a spark relationship. The spark relationship may be based on the torque relationship above, inverted to solve for desired spark timing. For example only, for a given torque request ($I_{des}$), the spark control module 220 may determine the desired spark timing 224 using the relationship:

$$S_{des} = f^{-1}(T_{des}, APC, I, E, AF, OT, \#, EGR).$$

The spark relationship may be embodied as an equation and/or as a lookup table. The air/fuel ratio (AF) may be the actual air/fuel ratio, for example, as reported by the fuel control module 228.

One or more other engine actuators may additionally or alternatively be controlled based on the EGR fraction 244. For example, an EGR control module 272 may determine a desired EGR opening 276 based on the EGR fraction 244. The EGR actuator module 27 may control opening of the EGR valve 24 based on the desired EGR opening 276. Additionally or alternatively, the fuel control module 228 may selectively adjust one or more of the desired fueling parameters 232 based on the EGR fraction 244. One or more other engine actuators may additionally or alternatively be actuated based on the EGR fraction 244.

Figure 3:
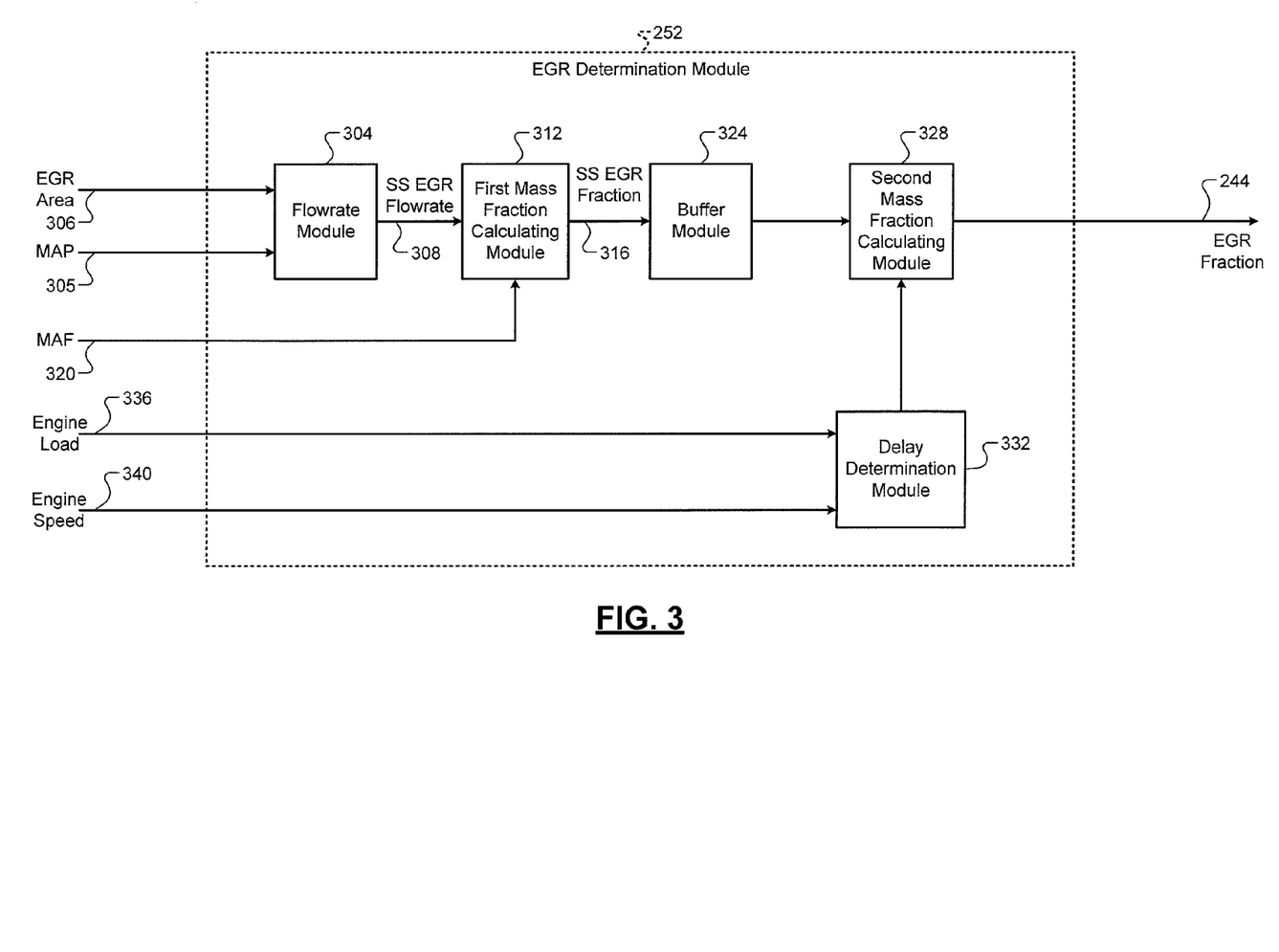
FIG. 3 is a functional block diagram of an example exhaust gas recirculation (EGR) determination module according to the present disclosure.

Referring now to FIG. 3, a functional block diagram of an example implementation of the EGR determination module 252 is presented. A flowrate module 304 determines a steady-state (SS) EGR flowrate 308. The SS EGR flowrate 308 corresponds to a mass flowrate of EGR back to the intake manifold 14 under SS EGR conditions. SS EGR conditions may refer to times when the SS EGR flowrate 308 varies less than a predetermined amount over a predetermined period.

The flowrate module 304 may determine the SS EGR flowrate 308 using the relationship:

$$\dot{m}_{EGR} = \frac{C_D * A_T * p_O}{\sqrt{R * T_O}} * \left(\frac{p_T}{p_O}\right)^{\frac{1}{\gamma}} * \left\{\frac{2 * \gamma}{\gamma - 1} * \left[1 - \left(\frac{p_T}{p_O}\right)^{\frac{(\gamma - 1)}{\gamma}}\right]\right\}^{\frac{1}{2}}$$

where ($\dot{m}_{EGR}$) is the (present) mass flowrate of EGR back to the engine 8 via the EGR system (i.e., the SS EGR flowrate 308) and is a function of opening area ($A_T$) of the EGR valve 24, pressure ($p_O$) upstream of the EGR valve 24, a temperature ($T_O$), pressure ($p_T$) downstream of the EGR valve 24 (e.g., a pressure within the intake manifold 14), and various constants ($C_D$, R, $\gamma$). This relationship may be embodied as equation, such as the equation above, or as a mapping (e.g., a lookup table) that relates the above parameters to the SS EGR flowrate 308. The pressure within the intake manifold 14 may be MAP 305 measured using the MAP sensor 36. An EGR position sensor may measure a position of the EGR valve 24, and opening area 306 of the EGR valve 24 may be determined based on the position of the EGR valve 24.

For each combustion event of the engine 8, a gas charge is drawn into a cylinder. The gas charge may include: ambient air drawn through the throttle valve 12; and exhaust gas recirculated back via the EGR system. The gas charge may also include one or more other gasses, such as fuel vapor provided by a fuel vapor purge system (not shown).

A first mass fraction calculating module 312 determines a SS EGR fraction 316 for a next combustion event of the engine 8. The SS EGR fraction 316 corresponds to a mass fraction of EGR under SS EGR conditions to the mass of the gas charge of the next combustion event of the engine 8. The first mass fraction calculating module 312 determines the SS EGR fraction 316 for the next combustion event based on the SS EGR flowrate 308 and mass air flowrate (MAF) 320. The MAF 320 may be measured using the MAF sensor 44. The first mass fraction calculating module 312 may determine the SS EGR fraction 316 for the next combustion event, for example, using the equation:

$$SSFraction = \frac{\dot{m}_{EGR}}{\dot{m}_{EGR} + \dot{m}_{MAF}},$$

where SSFraction is the SS EGR fraction 316 and is a function of the SS EGR flowrate 308 ($\dot{m}_{EGR}$) and the MAF ($\dot{m}_{MAF}$) 320.

A buffer module 324 may include a ring buffer, a first-in first-out (FIFO) buffer, a shift register, etc. Each time the SS EGR fraction 316 is determined, the buffer module 324 stores the SS EGR fraction 316 and an oldest stored value of the SS EGR fraction 316 is removed. The buffer module 324 includes a predetermined number of the most recently determined values of the SS EGR fraction 316.

A second mass fraction calculating module 328 determines the EGR fraction 244 for the next combustion event of the engine 8 based on a plurality of the values of the SS EGR fraction 316 stored in the buffer module 324. The second mass fraction calculating module 328 may determine the EGR fraction 244 for the next combustion event based on an average, such as a weighted average, of a plurality of the stored values of the SS EGR fraction 316. The values of the SS EGR fraction 316 used to determine the EGR fraction 244 may be the most recently determined/stored values.

The second mass fraction calculating module 328 may determine the EGR fraction 244 for the next combustion event using the equation:

$$EGRFraction = \frac{\left(\sum_{i=0}^{t-d}(t - d - i) * SSFrac_{t-1-i}\right)}{\left(\sum_{i=0}^{t-d}(t - d - i)\right)},$$

where EGRFraction is the EGR fraction 244, t is a number of combustion events between a combustion event of the engine 8 and a later combustion event where the EGR fraction 244 will reach SS (and therefore be equal to the SS EGR fraction 316) after a transient EGR condition occurs, d is a number of combustion events between a combustion event when a command is made that will cause a transient EGR condition and a later combustion event when the EGR fraction 244 will begin to change in response to the command, and SSFrac refers to the one of the stored values of the SS EGR fraction 316 for the combustion event t−1−i combustion events ago. t and d are integers, and d is less than t. An EGR transient condition can occur, for example, in response to a change in the opening of the throttle valve 12, in response to a change in the opening of the EGR valve 24, in response to a change in pressure within the intake manifold 14, or in response to another suitable event that causes a change in the mass flowrate of exhaust gas recirculation back to the intake manifold 14.

In various implementations, t and d may be constant values that are calibrated based on physical factors, such as cylinder volume, volume of the intake manifold 14, and volume of the EGR system through which exhaust gas travels when recirculated. In various implementations, t and/or d may be variable values and may be set by a delay determination module 332. The delay determination module 332 may set t and/or d, for example, using one or more functions or mappings that relate engine load 336 and/or engine speed 340 to t and/or d. The one or more functions or mappings are calibrated based on the physical factors, such as the cylinder volume, the volume of the intake manifold 14, and the volume of the EGR system.

Figure 4:
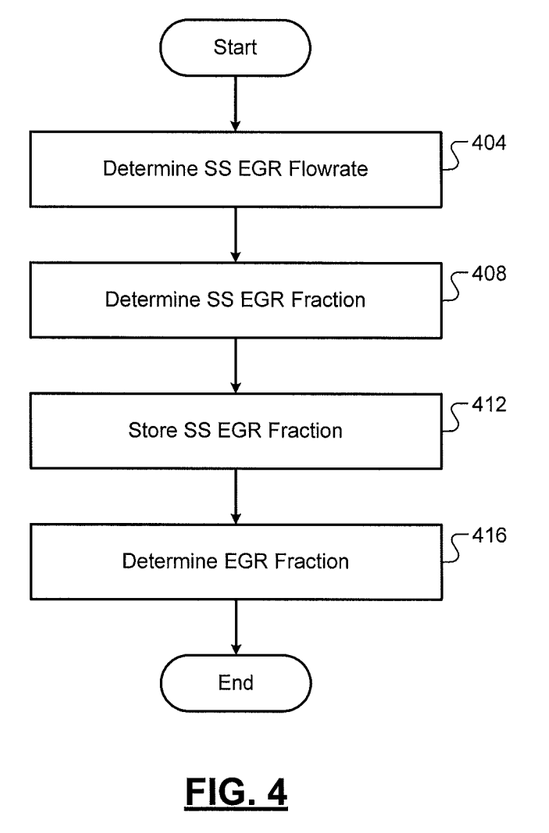
FIG. 4 is a flowchart depicting an example method of determining an EGR fraction according to the present disclosure.

Referring now to FIG. 4, a flowchart depicting an example method of determining the EGR fraction 244 is presented. Control may begin with 404 where control determines the SS EGR flowrate 308. Control may determine the SS EGR flowrate 308, for example, using the equation:

$$\dot{m}_{EGR} = \frac{C_D * A_T * p_O}{\sqrt{R * T_O}} * \left(\frac{p_T}{p_O}\right)^{\frac{1}{\gamma}} * \left\{\frac{2*\gamma}{\gamma-1} * \left[1 - \left(\frac{p_T}{p_O}\right)^{\frac{(\gamma-1)}{\gamma}}\right]\right\}^{\frac{1}{2}}$$

where ($\dot{m}_{EGR}$) is the SS EGR flowrate 308 and is a function of opening area ($A_T$) of the EGR valve 24, pressure ($p_O$) upstream of the EGR valve 24, a temperature ($T_O$), pressure ($p_r$) downstream of the EGR valve 24 (e.g., pressure within the intake manifold 14), and various constants ($C_D$, R, γ). Control continues with 408.

At 408, control determines the SS EGR fraction 316 for the next combustion event of the engine 8. Control determines the SS EGR fraction 316 based on the SS EGR flowrate 308 and the MAF 320. Control may determine the SS EGR fraction 316 using the equation:

$$SSFraction = \frac{\dot{m}_{EGR}}{\dot{m}_{EGR} + \dot{m}_{MAF}},$$

where SSFraction is the SS EGR fraction 316 and is a function of the SS EGR flowrate 308 ($\dot{m}_{EGR}$) and the MAF ($\dot{m}_{MAF}$) 320. Control continues with 412.

Control stores the SS EGR fraction 316 in the buffer module 324 at 412. Control also removes an oldest stored value of the SS EGR fraction 316 at 412. The buffer module 324 includes the predetermined number of the most recently determined values of the SS EGR fraction 316. Control continues with 416.

At 416, control determines the EGR fraction 244 for the next combustion event of the engine 8. Control determines the EGR fraction 244 based on a plurality of the stored values of the SS EGR fraction 316. Control may determine the EGR fraction 244, for example, using the equation:

$$EGRFraction = \frac{\left(\sum_{i=0}^{t-d}(t-d-i)*SSFrac_{t-1-i}\right)}{\left(\sum_{i=0}^{t-d}(t-d-i)\right)},$$

where EGRFraction is the EGR fraction 244, t is the number of combustion events between a combustion event of the engine 8 and a later combustion event where the EGR fraction 244 will reach SS (and therefore be equal to the SS EGR fraction 316) after a transient EGR condition occurs, d is the number of combustion events between a combustion event when a command is made that will cause a transient EGR condition and a later combustion event when the EGR fraction 244 will begin to change in response to the command, and SSFrac refers to the one of the stored values of the SS EGR fraction 316 for the combustion event t−1−i combustion events ago.

Control may selectively adjust one or more engine operating parameters based on the EGR fraction 244. For example, control may determine the estimated torque 240 based on the EGR fraction 244 and selectively adjust opening of the throttle valve 12 based on the estimated torque 240. Based on the EGR fraction 244, control may additionally or alternatively adjust one or more other engine airflow actuators, such as one or more boost devices, one or more valve actuators, etc. Additionally or alternatively, control may selectively adjust opening of the EGR valve 24 based on the EGR fraction 244. Additionally or alternatively, control may selectively adjust spark timing and/or fueling amount and/or timing based on the EGR fraction 244. While control is shown as ending after 416, FIG. 4 may be illustrative of one control loop. Control may return to 404 and execute one control loop ever predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An engine control system for a vehicle, comprising:
a flowrate module that determines a mass flowrate of exhaust gas recirculation (EGR) to an engine;
a first mass fraction calculating module that, based on the mass flowrate of EGR, determines a first mass fraction of recirculated exhaust gas of a first gas charge for a first combustion event of the engine;
a second mass fraction calculating module that determines a second mass fraction of recirculated exhaust gas of a second gas charge for a second combustion event of the engine based on an average of the first mass fraction and one or more other values of the first mass fraction determined for other combustion events, respectively; and
an actuator control module that selectively adjusts an engine operating parameter based on the second mass fraction.

2. The engine control system of claim 1 wherein the second mass fraction calculating module sets the second mass fraction equal to a weighted average of the first mass fraction and the one or more other values of the first mass fraction.

3. The engine control system of claim 2 wherein:
the second mass fraction calculating module determines the weighted average based on the first mass fraction, the one or more other values of the first mass fraction, and first and second weighting values;
the first and second weighting values are integers greater than zero;
the first weighting value corresponds to a number of combustion events between a third combustion event of engine when a change in EGR flow occurs and a fourth combustion event when the EGR flow is later expected to reach steady-state; and
the second weighting value corresponds to a number of combustion events between the third combustion event and a fifth combustion event when the first mass fraction is expected to begin changing in response to the change in EGR flow.

4. The engine control system of claim 3 further comprising a delay determination module that sets at least one of the first and second weighting values based on at least one of an engine speed and an engine load.

5. The engine control system of claim 3 wherein the first and second weighting values are predetermined values and are constant.

6. The engine control system of claim 1 wherein the first mass fraction calculating module determines the first mass fraction further based on a mass air flowrate (MAF).

7. The engine control system of claim 6 wherein the first mass fraction calculating module sets the first mass fraction equal to the mass flowrate of EGR divided by a sum of the mass flowrate of EGR and the MAF.

8. The engine control system of claim 1 further comprising a torque estimation module that estimates a torque output of the engine based on the second mass fraction, wherein the actuator control module selectively adjusts opening of a throttle valve based on the torque output.

9. The engine control system of claim 1 wherein the actuator control module selectively adjusts at least one of spark timing and fueling based on the second mass fraction.

10. The engine control system of claim 1 wherein the actuator control module selectively adjusts opening of an EGR valve based on the second mass fraction.

11. An engine control method for a vehicle, comprising:
determining a mass flowrate of exhaust gas recirculation (EGR) to an engine;
based on the mass flowrate of EGR, determining a first mass fraction of recirculated exhaust gas of a first gas charge for a first combustion event of the engine;
determining a second mass fraction of recirculated exhaust gas of a second gas charge for a second combustion event of the engine based on an average of the first mass fraction and one or more other values of the first mass fraction determined for other combustion events, respectively; and
selectively adjusting an engine operating parameter based on the second mass fraction.

12. The engine control method of claim 11 further comprising setting the second mass fraction equal to a weighted average of the first mass fraction and the one or more other values of the first mass fraction.

13. The engine control method of claim 12 further comprising determining the weighted average based on the first mass fraction, the one or more other values of the first mass fraction, and first and second weighting values, wherein:
the first and second weighting values are integers greater than zero;
the first weighting value corresponds to a number of combustion events between a third combustion event of engine when a change in EGR flow occurs and a fourth combustion event when the EGR flow is later expected to reach steady-state; and
the second weighting value corresponds to a number of combustion events between the third combustion event and a fifth combustion event when the first mass fraction is expected to begin changing in response to the change in EGR flow.

14. The engine control method of claim 13 further comprising setting at least one of the first and second weighting values based on at least one of an engine speed and an engine load.

15. The engine control method of claim 13 wherein the first and second weighting values are predetermined values and are constant.

16. The engine control method of claim 11 further comprising determining the first mass fraction further based on a mass air flowrate (MAF).

17. The engine control method of claim 16 further comprising setting the first mass fraction equal to the mass flowrate of EGR divided by a sum of the mass flowrate of EGR and the MAF.

18. The engine control method of claim 11 further comprising:
estimating a torque output of the engine based on the second mass fraction; and
selectively adjusting opening of a throttle valve based on the torque output.

19. The engine control method of claim 11 further comprising selectively adjusting at least one of spark timing and fueling based on the second mass fraction.

20. The engine control method of claim 11 further comprising selectively adjusting opening of an EGR valve based on the second mass fraction.

* * * * *